(12) United States Patent
Abe

(10) Patent No.: US 7,705,556 B2
(45) Date of Patent: Apr. 27, 2010

(54) VEHICLE CONTROL SYSTEM CAPABLE OF CONTROLLING ELECTRIC-POWER GENERATION STATE OF VEHICLE ALTERNATOR

(75) Inventor: Kunihiro Abe, Higashimurayama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/320,180

(22) Filed: Jan. 21, 2009

(65) Prior Publication Data

US 2009/0189570 A1 Jul. 30, 2009

(30) Foreign Application Priority Data

Jan. 28, 2008 (JP) .............................. 2008-016086

(51) Int. Cl.
  H02J 7/00 (2006.01)
  H02J 7/14 (2006.01)
  H02P 9/10 (2006.01)
(52) U.S. Cl. .......................... 320/104; 320/123; 322/88
(58) Field of Classification Search ................. 320/104, 320/123; 322/88; 290/16, 19, 50
  See application file for complete search history.

(56) References Cited

U.S. PATENT DOCUMENTS

| | | | | |
|---|---|---|---|---|
| 4,379,990 | A * | 4/1983 | Sievers et al. | 322/99 |
| 5,629,606 | A | 5/1997 | Asada | |
| 5,786,640 | A * | 7/1998 | Sakai et al. | 290/17 |
| 6,486,634 | B2 * | 11/2002 | Kokubun et al. | 320/104 |
| 7,009,366 | B2 * | 3/2006 | Maehara | 322/28 |
| 7,091,626 | B2 * | 8/2006 | Bluemel et al. | 290/40 C |
| 7,235,953 | B2 * | 6/2007 | Aoyama | 322/28 |
| 7,405,541 | B2 * | 7/2008 | Inokuchi et al. | 322/8 |

2006/0108987 A1 5/2006 Aoyama

FOREIGN PATENT DOCUMENTS

| | | |
|---|---|---|
| JP | A-08-238000 | 9/1996 |
| JP | A-2003-068366 | 3/2003 |
| JP | A-2003-68366 | 3/2003 |
| JP | A-2006-180682 | 7/2006 |
| JP | A-2007-97336 | 4/2007 |
| JP | A-2007-230513 | 9/2007 |

OTHER PUBLICATIONS

Japanese Notification of Reasons for Rejection for corresponding Japanese Application No. 2008-016086, mailed on Nov. 24, 2009.

* cited by examiner

*Primary Examiner*—Edward Tso
*Assistant Examiner*—Richard V Muralidar
(74) *Attorney, Agent, or Firm*—Oliff & Berridge, PLC

(57) ABSTRACT

A vehicle control system has a battery, a vehicle alternator for charging the battery, a vehicle-alternator control device capable of controlling the vehicle alternator, and a battery current detection device. The battery current detection device has a battery current detecting means capable of detecting a charging/discharging current of the battery, a battery voltage detection means capable of detecting a voltage of the battery, a battery temperature detection means capable of detecting a temperature of the battery, a microcomputer, and a communication controller. The communication controller performs digital data communication to transfer digital control signals between the vehicle alternator and the battery current detection device. The vehicle alternator has a display unit to display the occurrence of abnormal information of those detection means transferred from the battery current detection device, the occurrence of a battery failure, and a disconnecting of a charging wire of the battery by using different display patterns.

10 Claims, 8 Drawing Sheets

VEHICLE CONTROL SYSTEM CAPABLE OF CONTROLLING ELECTRIC-POWER GENERATION STATE OF VEHICLE ALTERNATOR

CROSS-REFERENCE TO RELATED APPLICATION

This application is related to and claims priority from Japanese Patent Application No. 2008-16086 filed on Jan. 28, 2008, the contents of which are hereby incorporated by reference.

BACKGROUND OF THE INVENTION

1. Field of the Invention

The present invention relates to vehicle control systems capable of controlling electric-power generation state of a vehicle alternator based on a battery condition mounted to vehicles such as passenger vehicles and trucks.

2. Description of the Related Art

There is a well-known sensor failure detection device equipped with a data processing unit and a special display unit mounted to a vehicle. The data processing unit detects the occurrence of a current sensor failure and a voltage sensor failure. The current sensor detects a charging current and a discharging current of a battery. On the other hand, the voltage sensor detects the output voltage of the battery. The display unit displays the occurrence of a current sensor failure or a voltage sensor failure in order to inform the occurrence of those sensor failures to the vehicle driver and passengers. For example, Japanese patent laid open publication NO. JP 2003-68366 discloses such a conventional sensor failure detection device.

There is another well-known control device such as engine control unit (ECU) capable of controlling the generation amount of electric power of a vehicle alternator based on a battery temperature detected by a battery temperature sensor. The ECU further detects the occurrence of abnormal state of the battery temperature sensor. When detecting the occurrence of abnormal state of the battery temperature sensor, the ECU informs a vehicle driver the occurrence of abnormal state of the battery temperature sensor through a warning lamp. For example, Japanese patent laid open publication NO. JP 2007-97336 discloses such a conventional control device.

The former and latter conventional control devices described above inform to the vehicle driver or passengers the occurrence of abnormal state of the temperature sensor and the voltage sensor through the display unit or the warning lamp when the data processing unit or the ECU detects the abnormal state of each sensor.

However, those conventional devices are equipped with an additional special display unit or an additional special warning lamp in order to display the occurrence of abnormal state of each sensor. This requires an additional area of packaging an instrument panel on which the special display unit or special warning lamp is mounted. This further increases the total manufacturing cost thereof.

SUMMARY OF THE INVENTION

It is an object of the present invention to provide a vehicle control system capable of informing the occurrence of abnormal state of detection means for a battery, for example, a current sensor a voltage sensor, and a temperature sensor with certainly without increasing an area of packaging an instrument panel and its manufacturing cost.

To achieve the above purposes, the present invention provides a vehicle control system has a battery, a vehicle alternator capable of charging the battery, and a battery current detection device. The battery current detection device has a battery current detecting means, a battery voltage detection means, a battery voltage detection means, a battery temperature detection means, a control means, a communication means, and an abnormal state judgment means. The battery current detection means detects a charging current and a discharging current of the battery. The battery voltage detection means detects a terminal voltage of the battery. The battery temperature detection means detects a temperature of the battery. The control means generates an electric-power generation control signal in order to control the operation of the vehicle alternator based on detection results transferred from the battery current detecting means, the battery voltage detection means, and the battery temperature detection means. The communication means performs a digital data transfer between the vehicle alternator and the battery current detection device. The abnormal state judgment means judges whether or not an abnormal state of each of the battery current detecting means, the battery voltage detection means, and the battery temperature detection means occurs. The communication means transfers abnormal state information to inform the occurrence of abnormal state of each of the battery current detecting means, the battery voltage detection means, and the battery temperature detection means to the vehicle alternator through the communication line.

It is also preferable that the vehicle alternator has a display unit and an abnormality information means that informs the occurrence of abnormal state of each detection means. The vehicle alternator informs the occurrence of abnormal state of each detection means to a vehicle driver through the display unit when receiving the abnormal state information transferred from the battery current detection device.

It is not necessary to equip the vehicle with any special display unit or any additional display unit to inform the abnormality information of each detection means because the vehicle control system informs the occurrence of abnormal state of each detection means through the display unit which is already mounted to the vehicle alternator. This structure can avoid increasing any area of packaging the instrument panel and the manufacturing cost of the vehicle control system. Still further, because the vehicle control system according to the present invention transfers the abnormality information between the battery current detection device and the vehicle alternator through the digital communication line, it is possible to reduce the influence of noise caused in the data transmission. Still further, because the vehicle control system can transfer the abnormality information to the vehicle alternator in order to inform the occurrence of abnormal state of each detection means without using any electric control unit (ECU), this can reduce the processing load of the ECU.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
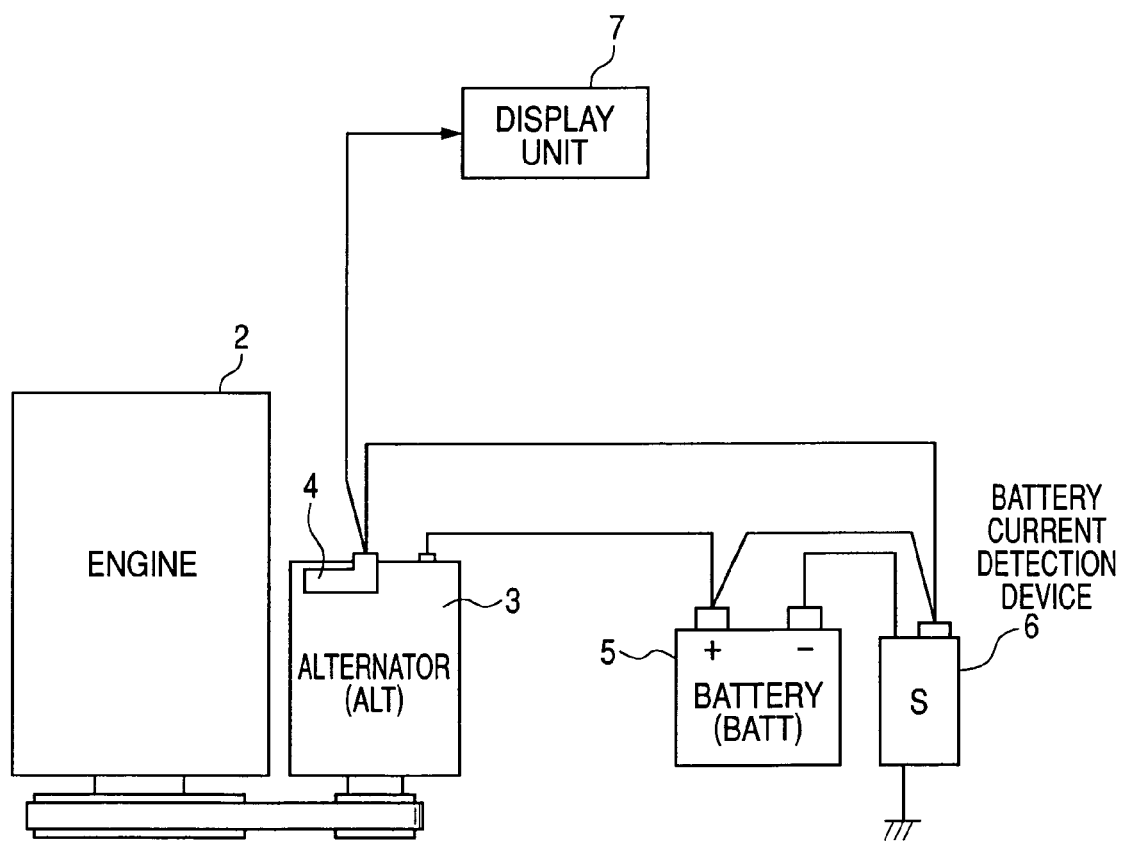
FIG. 1 is a diagram showing a schematic entire structure of a vehicle control system according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the vehicle control system according to an embodiment of the present invention with reference to FIG. 1 to FIG. 9.

FIG. 1 is a diagram showing a schematic entire structure of the vehicle control system according to an embodiment of the present invention. As shown in FIG. 1, the vehicle control system is comprised of an internal combustion engine 2 (or the "engine 2" for short), a vehicle alternator (ALT) 3, a car battery (BATT) 5 (which will be referred to as the "battery 5" for short), a battery current detection device (S) 6, and a display unit 7. The vehicle alternator 3 has a built-in electric power generation control device 4 (hereinafter, which will be referred to as the "electric power generation control device 4" for short, and explained later in detail) with the display unit 7. The display unit 7 is electrically connected to a lamp (L) terminal of the electric power generation control device 4.

The vehicle alternator 3 rotates by an output power of the engine 2 to generate electric power. The vehicle alternator 3 provides the generated electric power to the battery 5 and various types of electrical loads (not shown) in order to charge the battery 5 and to operate those electrical loads.

As described above, the vehicle alternator 3 has the electric power generation control device 4. The electric power generation control device 4 regulates an exciting current to be supplied to the vehicle alternator 3 in order to control the output voltage of the vehicle alternator 3.

The battery current detection device 6 is placed near the battery 5. The battery current detection device 6 detects a charging current and a discharging current, and further performs various operations (its detail will be described later). The battery current detection device 6 is fixedly attached to a terminal or a casing of the battery 5, for example.

The display unit 7 is electrically connected to the electric power generation control device 4 for the vehicle alternator 3 through an L (light) terminal. That is, the L terminal of the vehicle alternator 3 is electrically connected to the display unit 7. The display unit 7 is a warning lamp for the vehicle alternator 3. The display unit 7 as the warning lamp is mounted on an instrument panel. Through the display unit 7, the electric power generation control device 4 provides warning of occurring abnormal state of the electric power generation in the vehicle alternator 3, and provides various notice (its detail will be described later) to the vehicle driver or passengers.

Figure 2:
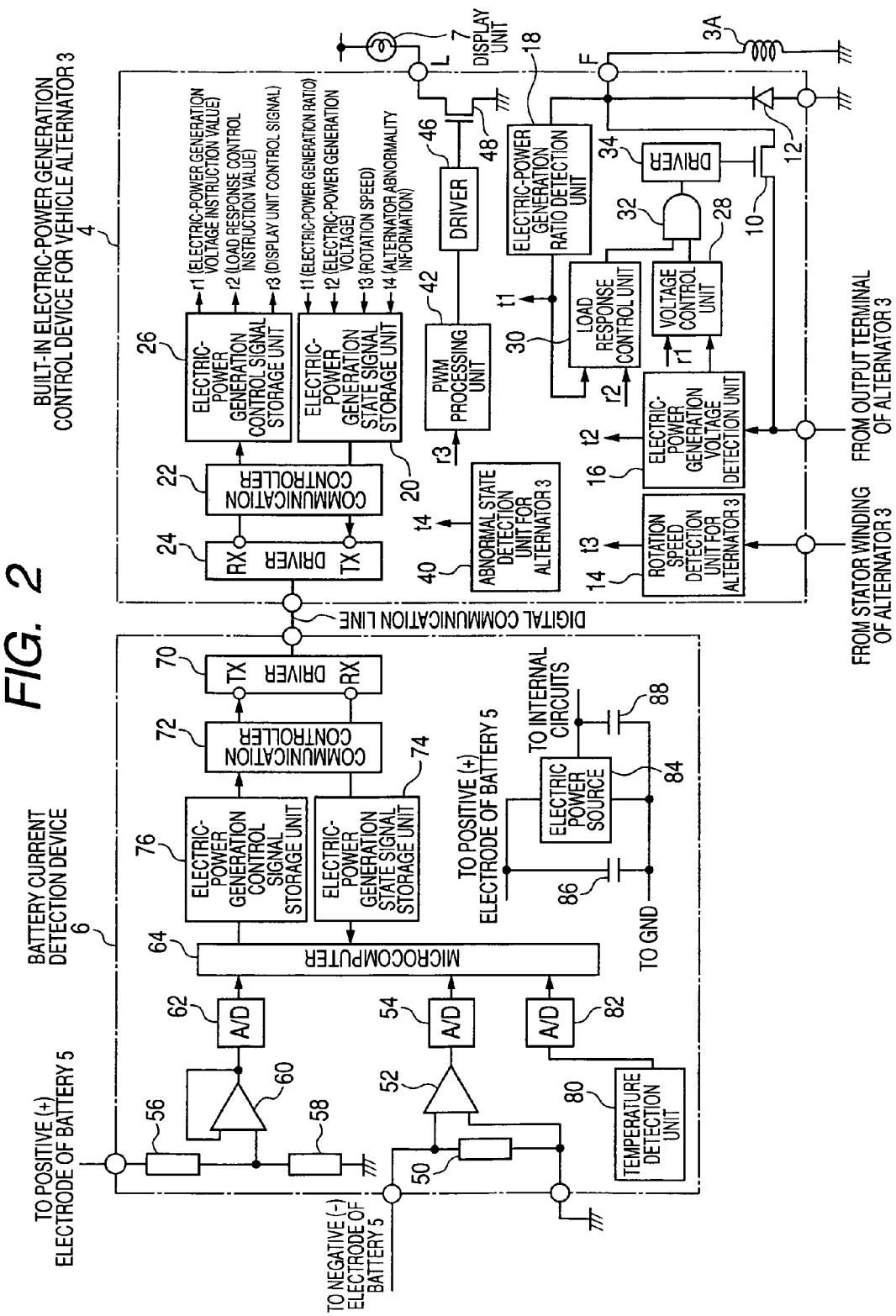
FIG. 2 is a block diagram showing a detailed configuration of the vehicle control system equipped with a battery current detection device and a built-in electric power generation control device of a vehicle alternator according to the embodiment of the present invention.

FIG. 2 is a block diagram showing an detailed configuration of the vehicle control system equipped of the battery current detection device 6 and the electric power generation control device 4 of the vehicle alternator 3 according to the embodiment of the present invention. As shown in FIG. 2, the electric power generation control device 4 is comprised of a power transistor 10, a free wheel diode 12, an alternator speed detection unit 14, an electric-power generation voltage detection unit 16, a generation ratio detection unit 18, an electric-power generation state signal storage unit 20, a communication controller 22, a driver 24, an electric-power generation control signal storage unit 26, a voltage control unit 28, a load response control unit 30, an AND circuit 32, drivers 34 and 36, an abnormal generation detection unit 40, a pulse width modulation (PWM) processing unit 42, and a transistor 48.

The power transistor 10 is electrically connected in series to an exciting winding 3A of the vehicle alternator 3. When the power transistor 10 is turned on, the exciting current flows in the exciting winding 3A.

The free wheel diode 12 is electrically connected in parallel to the exciting winding 3A. When the power transistor 10 is turned off, the free wheel diode 12 circulates the exciting current flowing in the exciting winding 3A.

The alternator speed detection unit 14 detects the rotation speed (or the number of rotation) of the vehicle alternator 3. For example, the alternator speed detection unit 14 monitors the frequency of a phase voltage of each phase winding that forms a stator winding (not shown) of the vehicle alternator 3 in order to detect the rotation speed of the vehicle alternator 3.

The electric-power generation voltage detection unit 16 detects, as the electric-power generation voltage, the voltage at the output terminal of the vehicle alternator 3.

The electric-power generation ratio detection unit 18 detects an electric power generation ratio that indicates the operation state (as an electric power generation state) of the vehicle alternator 3. For example, the generation ratio detection unit 18 monitors the voltage at an F terminal which is a connection node between the power transistor 10 (also connected to the free wheel diode 12 and the electric-power generation ratio detection unit 18) and the exciting winding 3A in order to detect an ON-duty of the power transistor 10 as the electric power generation ratio. The ON-duty of the power transistor 10 is a relative ratio of the turn-on state of the power transistor 10 to the turn-off state.

The abnormal generation detection unit 40 detects the occurrence of abnormal state of the vehicle alternator 3. For example, the abnormal generation detection unit 40 detects the occurrence of breaking, namely, disconnecting of and making a short circuit of the stator winding, the exciting winding, and the rectifier device. When detecting the occurrence of abnormal state, the abnormal generation detection unit 40 outputs alternator abnormality information (t4).

The generation ratio detection unit 18 detects and transfers an electric-power generation ratio (t1) to the electric-power generation state signal storage unit 20 (and also to the load response control unit 30). The electric-power generation voltage detection unit 16 detects and transfers an electric power generation voltage (t2) to the electric-power generation state signal storage unit 20. The alternator speed detection unit 14 detects and transfers a rotation speed (t3) of the vehicle alternator 3 to the electric-power generation state signal storage unit 20. The abnormal generation detection unit 40 outputs an electric-power generation state signal including the alternator abnormality information (t4) to the electric-power generation state signal storage unit 20.

When receiving those data items t1, t2, t3, and t4, the electric-power generation state signal storage unit 20 stores them into a memory thereof.

The communication controller 22 receives the stored electric-power generation state signal transferred from the electric-power generation state signal storage unit 20, and converts and modulates the received electric-power generation state signal using a predetermined format. The communication controller 22 transfers the modulated signal to the driver 24. The driver 24 transfers the modulated signal to the battery current detection device 6 through a digital communication line. The driver 24 also has a function to receive a digital modulated signal transferred from the battery current detection device 6 through the communication line.

The driver 24 receives a demodulated digital signal as an electric-power generation control signal transferred from the battery current detection device 6 through the communication line. The communication controller 22 demodulates the digital modulated signal.

The electric-power generation control signal obtained by the demodulation process of the communication controller 22 is stored in the electric-power generation control signal storage unit 26. The electric-power generation control signal includes an electric-power generation voltage instruction value (r1), a load response control instruction value (r2), a display unit control signal (r3).

The voltage control unit 28 controls the electric-power generation voltage of the vehicle alternator 3 to output a predetermined regulation voltage value which is indicated based on the electric-power generation voltage instruction value (r1). That is, the voltage control unit 28 outputs a control signal in order to achieve such a voltage control for the vehicle alternator 3.

The load response control unit 30 controls a load response to increase the electric-power generation ratio based on a ratio indicated by the load response control instruction value (r2). The load response control unit 30 outputs a control signal in order to achieve this load response control. When receiving the control signals transferred from the voltage control unit 28 and the load response control unit 30, the AND circuit 32 performs a logical product (AND) operation. The AND circuit 32 outputs a driving signal as the result of the logical AND operation to the driver 34. The driver 34 drives the power transistor 10 based on the driving signal transferred from the AND circuit 32.

When receiving the display unit control signal, the PWM processing unit 42 performs a pulse width modulation for the received display unit control signal, and then generates a notice signal. The driver 46 drives the transistor 48 according to the notice signal transferred from the PWM processing unit 42 in order to control the lighting of the display unit 7 which is electrically connected to the Light (L) terminal. The L terminal of the vehicle alternator 3 is electrically connected to the display unit which is a warning lamp for the vehicle alternator 3. The display unit 7 as the warning lamp is mounted on the instrument panel.

As shown in FIG. 2, the battery current detection device 6 is comprised of a shunt resistance 50, amplifiers 52 and 60, analogue to digital (A/D) converters 54, 62, and 82, resistances 56 and 58, a microcomputer 64 (as the control means described in the claims), a driver 70, a communication controller 72, an electric-power generation state signal storage unit 74, an electric-power generation control signal storage unit 76, a temperature detection unit 80, an electric power circuit 84, and capacitances 86 and 88.

The shunt resistance 50 is a resistance to detect a charging/discharging current of the battery 5. One end of the shunt resistance 50 is electrically connected to a negative (−) electrode terminal of the battery 5, and the other end of the shunt resistance 50 is grounded or earthed. The amplifier 52 is comprised of a differential amplifier, for example. The amplifier 52 amplifies the voltage at both the ends of the shunt resistance 50. The amplifier 52 outputs the amplified voltage to the A/D converter 54. The A/D converter converts the amplified voltage transferred from the amplifier 52 to digital data items. The A/D converter 52 outputs the digital data items to the microcomputer 64.

The resistances 56 and 58 form a voltage dividing circuit to detect the terminal voltage (as a battery voltage) of the battery 5. One end of the voltage dividing circuit is electrically connected to a positive electrode terminal of the battery 5. The other end of the voltage dividing circuit is grounded or earthed.

The amplifier 60 is an arithmetic amplifier, for example. The amplifier 60 serves as a buffer connected to the output side of the voltage dividing circuit comprised of the resistances 56 and 58. The output voltage of the amplifier 60 corresponds to the divided voltage at the connection node of the resistances 56 and 58 shown in FIG. 2.

The amplifier 60 outputs the output voltage to the A/D converter 62. The A/D converter 62 receives and converts the output voltage into the digital data items. The microcomputer 64 receives the digital data items transferred from the A/D converter 62.

The temperature detection unit 80 detects a temperature of the battery 5. For example, the temperature detection unit 80 outputs a voltage corresponding to the temperature of the battery 5. When receiving the voltage from the temperature detection unit 80, the A/D converter 62 converts the voltage into digital data items, and transfers the digital data items to the microcomputer 64. The microcomputer 64 calculates the condition of the battery 5 (for example, the charging state of the battery 5) based on the data items transferred from the A/D converters 54, 62, and 82, and the others. Based on the state of the battery 5, the microcomputer 64 determines the electric-power generation instruction value as the regulation voltage for the vehicle alternator 3 and the load response control instruction value as a control parameter to be used when the electric power generation control device 4 performs the load response control to the vehicle alternator 3.

The microcomputer 64 outputs the electric-power generation control signal which includes both the electric-power generation instruction value and the load response control instruction value. The power source circuit 84 supplies the electric power to the microcomputer 64 and other circuits to operate.

The driver 70 and the communication controller 72 perform the digital data communication between the battery current detection device 6 and the electric power generation control device 4 through the digital communication line. Those driver 70 and the communication controller 72 incorporated in the battery current detection device 6 basically perform the same operation of the driver 24 and the communication controller 72 incorporated in the electric power generation control device 4.

When the driver 70 receives the modulated digital signal (as the electric-power generation state signal) transferred from the electric power generation control device 4 through the digital communication line, the communication controller 72 demodulates the modulated digital signal in order to obtain the electric-power generation state signal. The electric-power generation state signal storage unit 74 stores the electric-power generation state signal transferred from the communication controller 72.

When the electric-power generation control signal transferred from the microcomputer 64 is stored in the electric-power generation control signal storage unit 76, the communication controller 72 modulates the electric-power generation control signal into a predetermined format data in order to perform the digital communication between the electric power generation control device 4 and the battery current detection device 6.

The driver 70 transfers the modulated digital signal to the electric power generation control device 4 through the digital communication line.

In the battery current detection device 6, the battery current detection means is comprised of the shunt resistance 50, the amplifier 52, and the A/D converter 54. The battery voltage detection means is comprised of the resistances 56 and 58, the amplifier 60, and the A/D converter 62. The battery temperature detection means is comprised of the temperature detection unit 80 and the A/D converter 82.

In the structure of the vehicle control system according to the embodiment of the present invention, the microcomputer 64 (as the control means described in the claims) in the battery current detection device 6 performs the detection operation to detect the occurrence of abnormal state of those detection means and to detect the battery failure and the disconnecting of the charging wire of the battery 5. The microcomputer 64 outputs the electric-power generation control signal including the abnormal information that indicate the occurrence of abnormal state of those detection means and the components in addition to the electric-power generation instruction value and the load response control instruction value described above.

The microcomputer 64 corresponds to the control means for the electric power generation of the vehicle alternator 3 and the abnormal judgment means. The driver 70 and the communication controller 72 correspond to the communication means.

A description will now be given of the operation of the vehicle control system according to the embodiment of the present invention having the structure described above.

Figure 3:
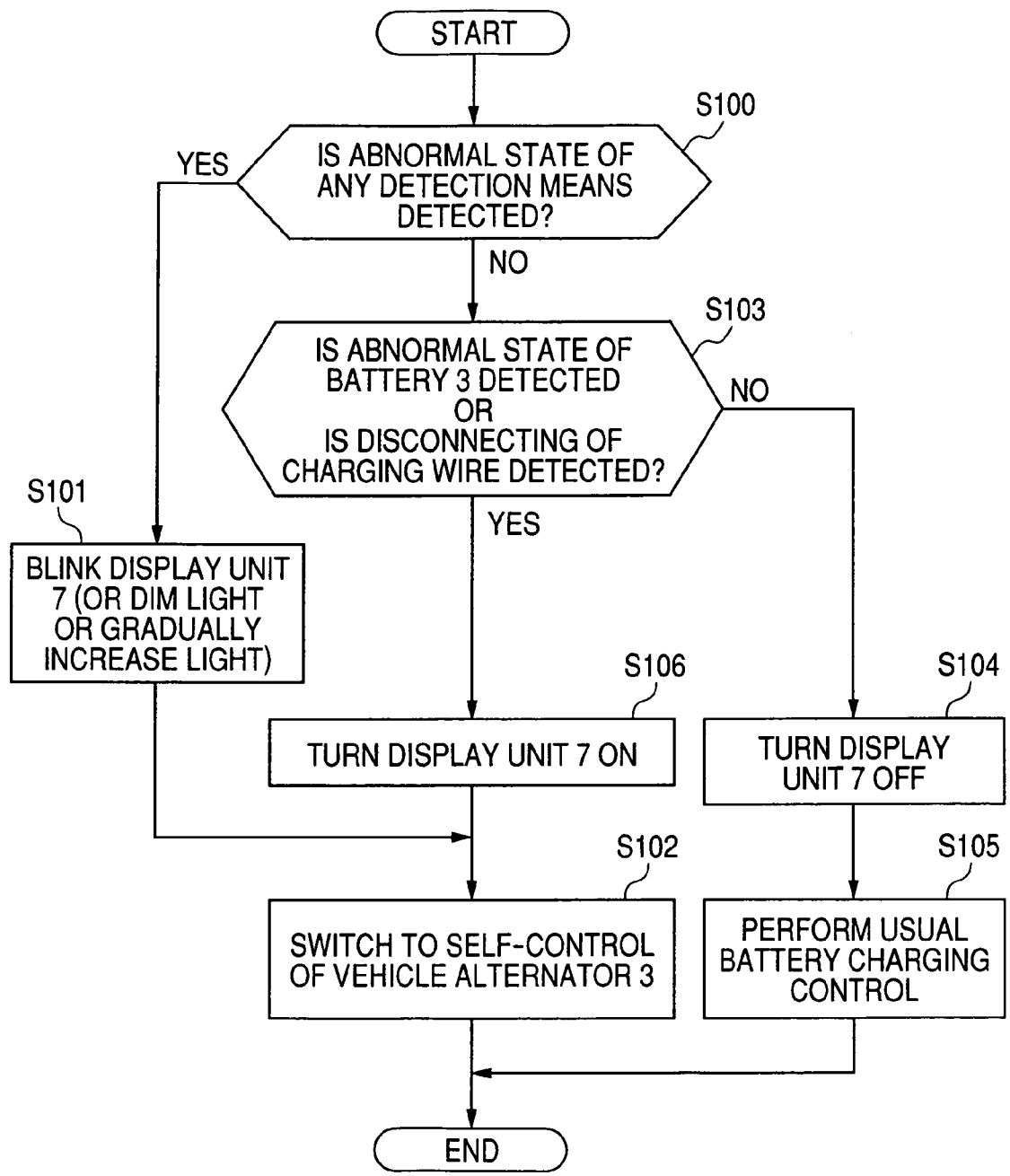
FIG. 3 is a flow chart showing the operation of the built-in electric power generation control device of the vehicle alternator in the vehicle control system according to the embodiment of the present invention.

FIG. 3 is a flow chart of the operation of the electric power generation control device 4 for the vehicle alternator 3 in the vehicle control system according to the embodiment of the present invention.

When the electric power generation control device 4 detects the occurrence of abnormal state of at least one of the detection means in the battery current detection device 6 (such as the battery current detection means, the battery voltage detection means, the battery temperature detection means) ("YES" in step S100), the operation flow goes to step S101. That is, in step S100, the electric power generation control device 4 judges whether or not the abnormal state occurs in each detection means based on the abnormal information contained in the electric-power generation state signal transferred from the battery current detection device 6 to the electric power generation control device 4. That is, when the electric power generation control device 4 judges the occurrence of abnormal state of any of the detection means ("YES" in step S100), the operation flow goes to step S101. In step S101, the PWM processing unit 42 transfers a PWM signal of a high and low level pattern to the driver 46 in order to control the lighting cycle of the display unit 7 (or the warning lamp) connected to the L terminal of the electric power generation control device 4 in the vehicle alternator 3. This lighting cycle in the display unit 7 when the abnormal state occurs in the detection means is distinguished from the lighting pattern of the display unit 7 when the battery failure or the disconnecting of the charging wire occurs (will be explained in step S106 later). For example, the driver 46 turns the display unit 7 on and off with a predetermined cycle, or dims down the brightness of the display unit 7 or gradually increases the brightness of the display unit 7 (step S101). The display pattern of the display unit 7 when the abnormal state occurs in the detection means is not limited by the above lighting pattern shown in step S101. For example, it is acceptable to use various patterns in order to inform the occurrence of abnormal state of each detection means to the vehicle driver or passengers provided it is distinguished from the lighting pattern when the battery failure or the disconnecting of the charging wire occurs.

Next, in step S102, the electric-power generation control for the vehicle alternator 3 is switched to a self-control performed by the electric power generation control device 4 in the vehicle alternator 3 which does not use the electric-power generation instruction value and the load response control instruction value transferred from the battery current detection device 6. For example, the self-control operation of the vehicle alternator 3 which is switched in step S102 uses predetermined values such as an electric-power generation instruction value to be used by the voltage control unit 28 or a load response control instruction value to be used by the load response control unit 30.

On the other hand, when the judgment result in step S100 indicates that there is no abnormal state in each detection means, the operation flow goes to step S103. In step S103, it is detected whether or not the battery failure occurs or whether or not the charging wire of the battery 5 is disconnected.

The electric power generation control device 4 detects the occurrence of the battery failure or the disconnecting of the charging wire of the battery 5 based on the abnormal information contained in the electric-power generation control signal transferred from the battery current detection device 6 to the electric power generation control device 4. When the battery failure or the disconnecting of the charging wire for the battery 5 does not occur ("NO" in step S103), the operation flow goes to step S104.

In step S104, the PWM processing unit 42 always outputs the drive signal of a low level to the driver 46. The driver 46 turns the display unit 47 off and does not turn it on until the driver 46 receives the drive signal of a high level. Therefore the display unit 47 does not light.

After this, the electric power generation control device 4 performs the usual charging control for the battery 5 based on the electric-power generation voltage instruction value and the load response control instruction value transferred from the battery current detection device 6 (step S105).

When the occurrence of the battery failure or the disconnecting of the charging wire of the battery 5 is detected ("YES" in step S103), the operation flow goes to step S106. In step S106, the PWM processing unit 42 outputs the PWM signal having a predetermined pattern with a constant high level or a on-duty of approximately 100% to the driver 46 in order to continue the lighting of the display unit 7 which is connected to the L terminal of the electric power generation control device 4 in the vehicle alternator 3.

After step S106, the operation flow goes to step S102. In step S102, the electric power generation control device 4 performs the self-control operation.

Figure 4:
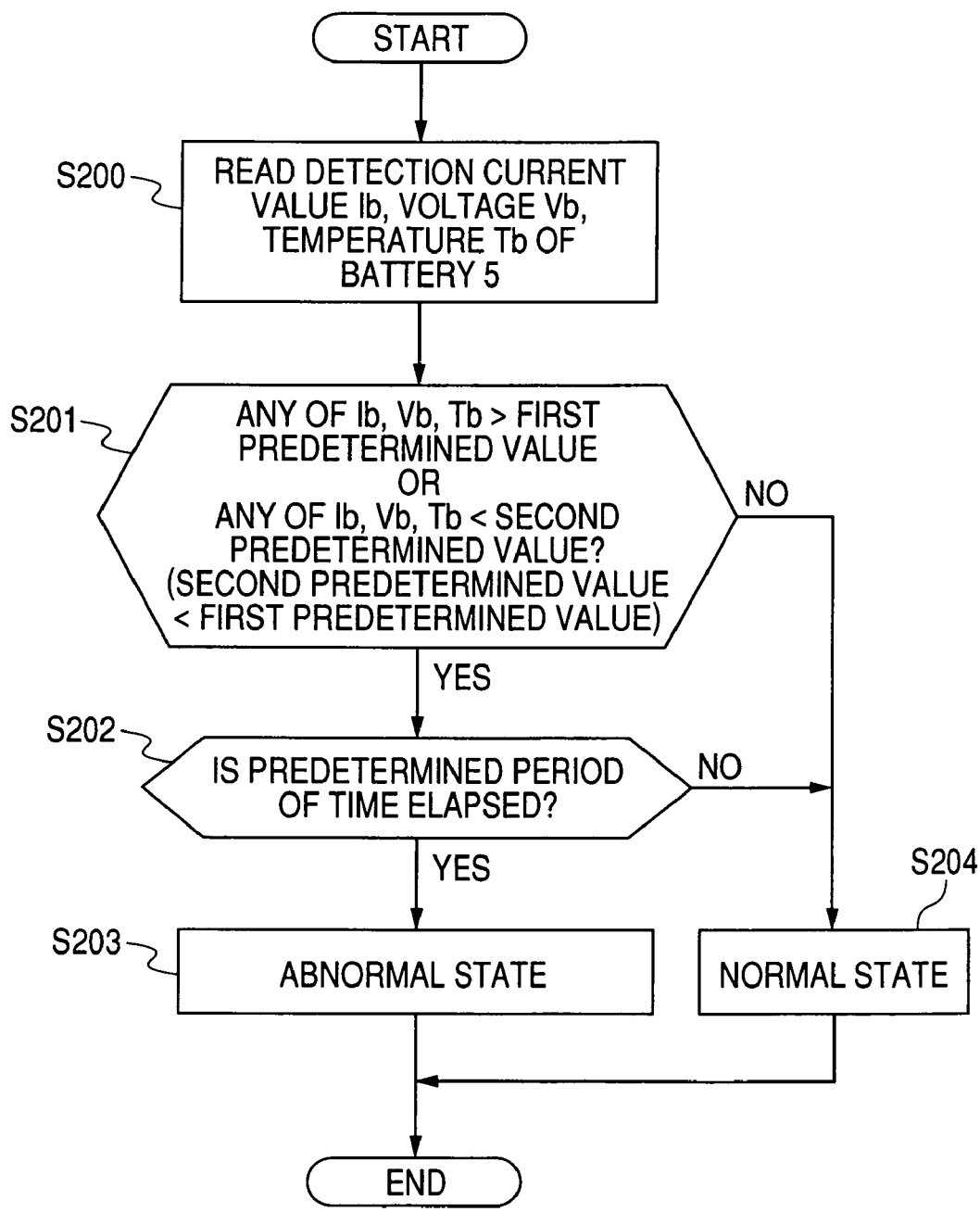
FIG. 4 is a flow chart showing the judging operation of judging occurrence of abnormal state of each detection means performed by the battery current detection device in the vehicle control system according to the embodiment of the present invention.

FIG. 4 is a flow chart of the judging operation of judging the occurrence of abnormal state of each detection means by the battery current detection device 6 in the vehicle control system according to the embodiment of the present invention.

When reading a battery current value Ib detected by the battery current detection means, a battery voltage value Vb detected by the battery voltage detection means, and a battery temperature Tb detected by the battery temperature detection means (step S200), the microcomputer 64 judges whether or not each of those detected values Ib, Vb, and Tb is more than a first predetermined value or whether or not each of those detected values Ib, Vb, and Tb is less than a second predetermined value (step S201). This judgment in step S201 checks whether or not each of those detected values Ib, Vb, and Tb is out of the predetermined range indicated by the first and second predetermined values. The first predetermined value and the second predetermined value are set in advance for each of the battery current value, the battery voltage value, and the battery temperature value.

When the judgment result in step S201 indicates that each of the detected values Ib, Vb, and Tb is out of the range indicated by the first and second predetermined values ("YES" in step S201), the operation flow goes to step S202.

In step S202, the microcomputer 64 judges how long it has been elapsed that the detected values are out of the predetermined range (step S202). When the elapsed period of time is not less than the predetermined period of time ("YES" in step S202), the microcomputer 64 judges that the detection means corresponding to the detected value which is out of the predetermined range is in the abnormal state (step S203).

On the other hand, the judgment result indicates that the elapsed period of time is less than the predetermined period of time ("NO" in step S202), the microcomputer 64 judges that no detection means has fallen into the abnormal state (step S204).

The abnormal information to be transferred from the battery current detection device 6 to the electric power generation control device 4 includes the judgment results obtained in step S203 and step S204.

Figure 5:
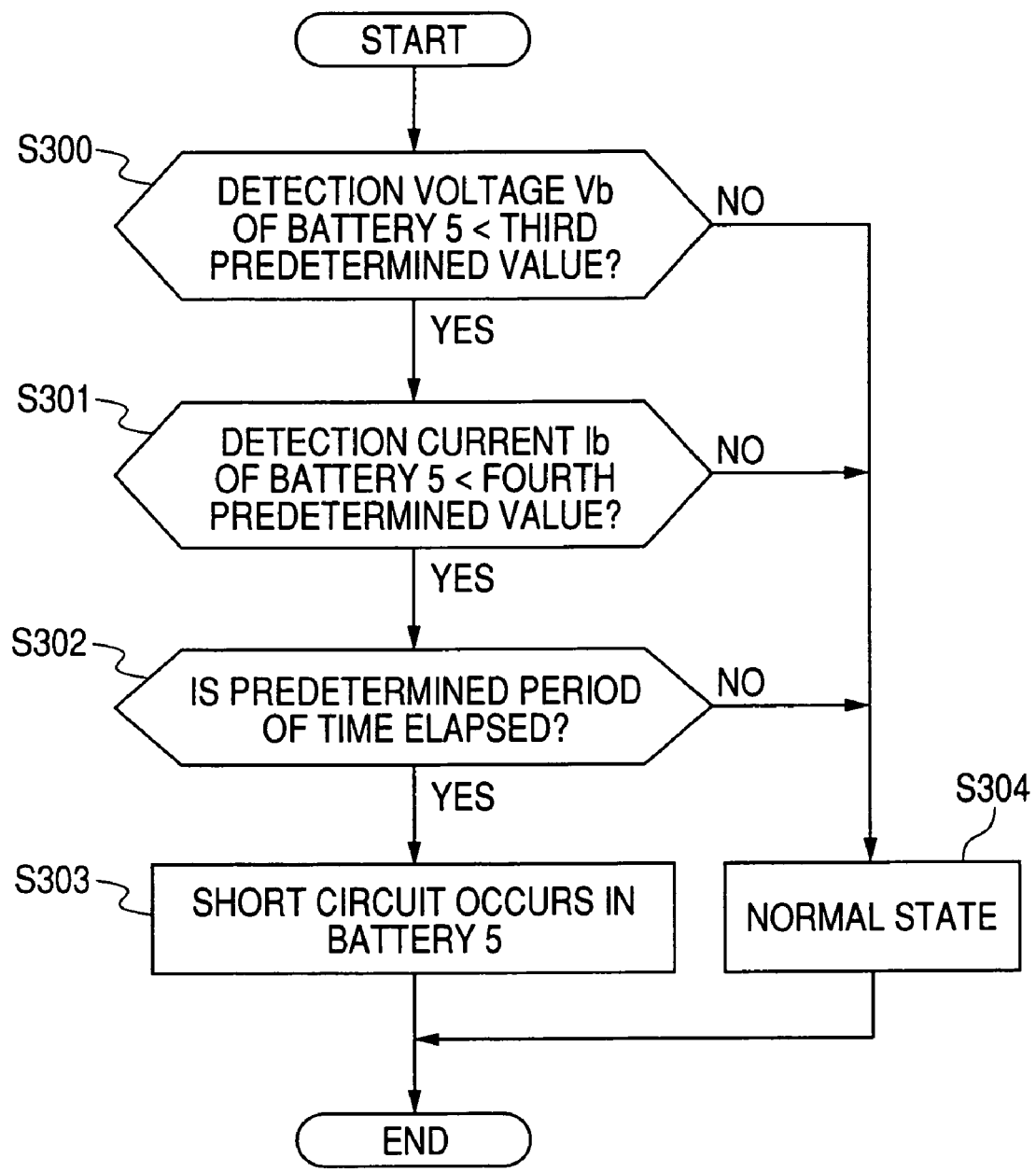
FIG. 5 is a flow chart showing the judging operation of judging occurrence of battery failure (namely, of making a short circuit failure of the battery) performed by the battery current detection device in the vehicle control system according to the embodiment of the present invention.

FIG. 5 is a flow chart of the judging operation of judging the occurrence of the battery failure (namely, of making a short circuit failure in the battery 5) by the battery current detection device 6 in the vehicle control system according to the embodiment of the present invention.

The microcomputer 64 reads the detected battery voltage value Vb through the A/D converter 62 and the detected battery current value Ib through the A/D converter 54. The microcomputer 64 then judges whether or not the detected battery voltage value Vb is less than a third predetermined value (step S300). The judgment result in step S300 indicates "YES", the operation flow goes to step S301. In step S301, the microcomputer 64 further judges whether or not the detected battery current value Ib is less than a fourth predetermined value.

When both the judgments in step S300 and S301 indicate "YES", the operation flow goes to step S302. In step S302, the microcomputer 64 judges whether or not the predetermined period of time is elapsed under the state of satisfying "YES" in both the steps S300 and S301. When the judgment result in step S302 indicates "YES", namely, the predetermined period of time has been elapsed, the microcomputer 64 judges that a short circuit is made in the inside of the battery 5 (step S303).

On the other hand, when the judgment result in each of steps S300, S301 and S302 is "NO" the microcomputer 64 judges that the battery 5 is in the normal condition (step S304).

Figure 6:
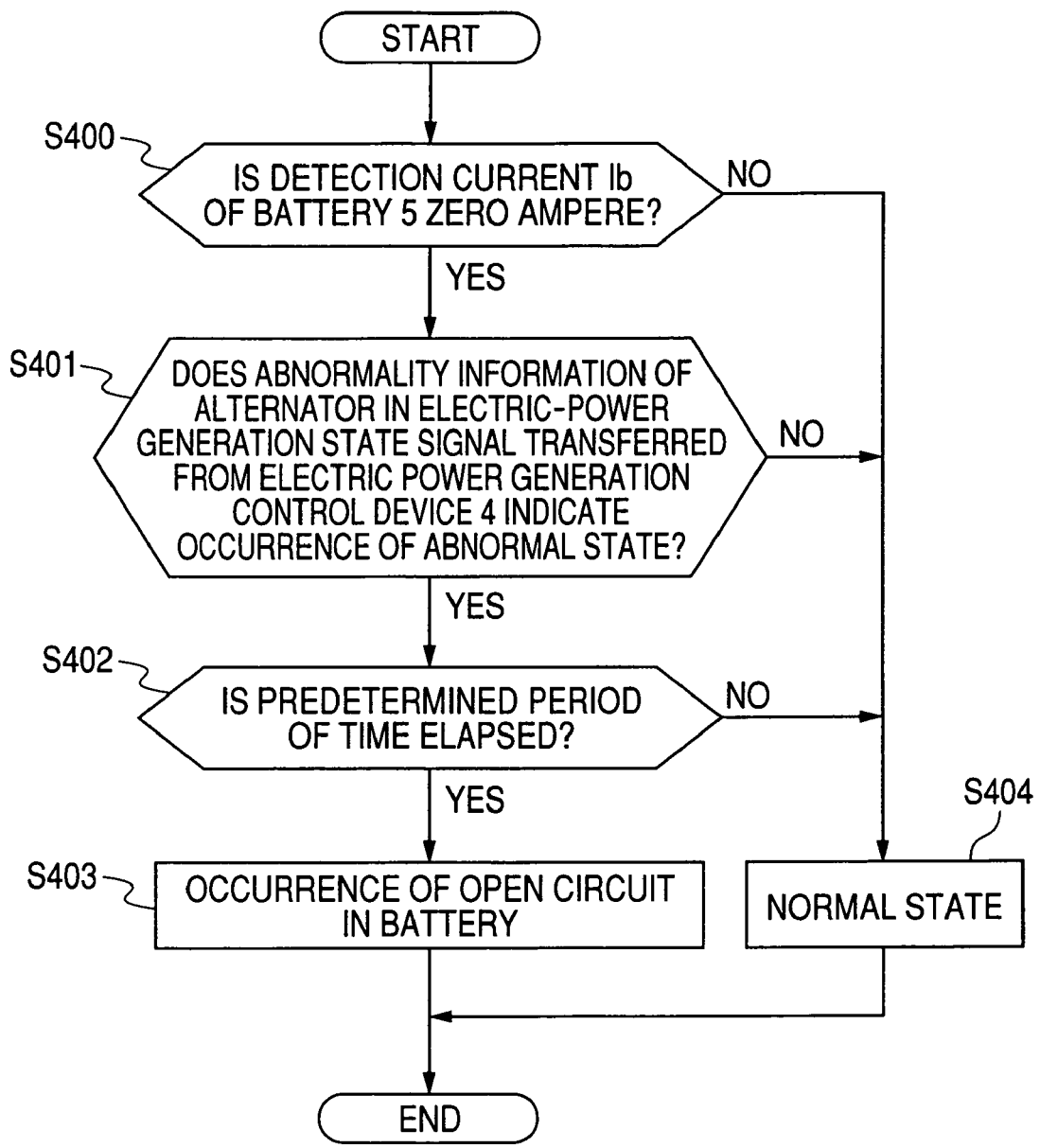
FIG. 6 is a flow chart showing the judging operation of judging occurrence of another battery failure (whether a battery open circuit failure has occurred) performed by the battery current detection device in the vehicle control system according to the embodiment of the present invention.

FIG. 6 is a flow chart of the judging operation of judging the occurrence of another battery failure (whether a battery open circuit failure has occurred) by the battery current detection device 6 in the vehicle control system according to the embodiment of the present invention.

The microcomputer 64 reads the detected battery current value Ib through the A/D converter 54 and an alternator abnormal signal in the electric-power generation state signal transferred from the electric power generation control device 4. The microcomputer 64 then judges whether or not the detected battery current value Ib is zero ampere (step S400). When the judgment result in step S400 indicates "YES", the operation flow goes to step S401. In step S401, the microcomputer 64 further judges whether or not the alternator abnormal signal contained in the electric-power generation state signal indicates the occurrence of the abnormal state.

When both the judgment results in step S400 and S401 indicate "YES", the operation flow goes to step S402.

In step S402, the microcomputer 64 judges whether or not a predetermined period of time is elapsed under the state of satisfying "YES" in both the steps S400 and S401. When the judgment result in step S402 indicates "YES", namely, the predetermined period of time has been elapsed, the microcomputer 64 judges whether a battery open circuit failure has occurred in the inside of the battery 5 (step S403).

On the other hand, when the judgment result in each of steps S400, S401, and S402 indicates "NO", the microcomputer 64 judges that the battery 5 is in the normal condition, no battery open circuit failure has occurred in the battery 5 (step S404).

Figure 7:
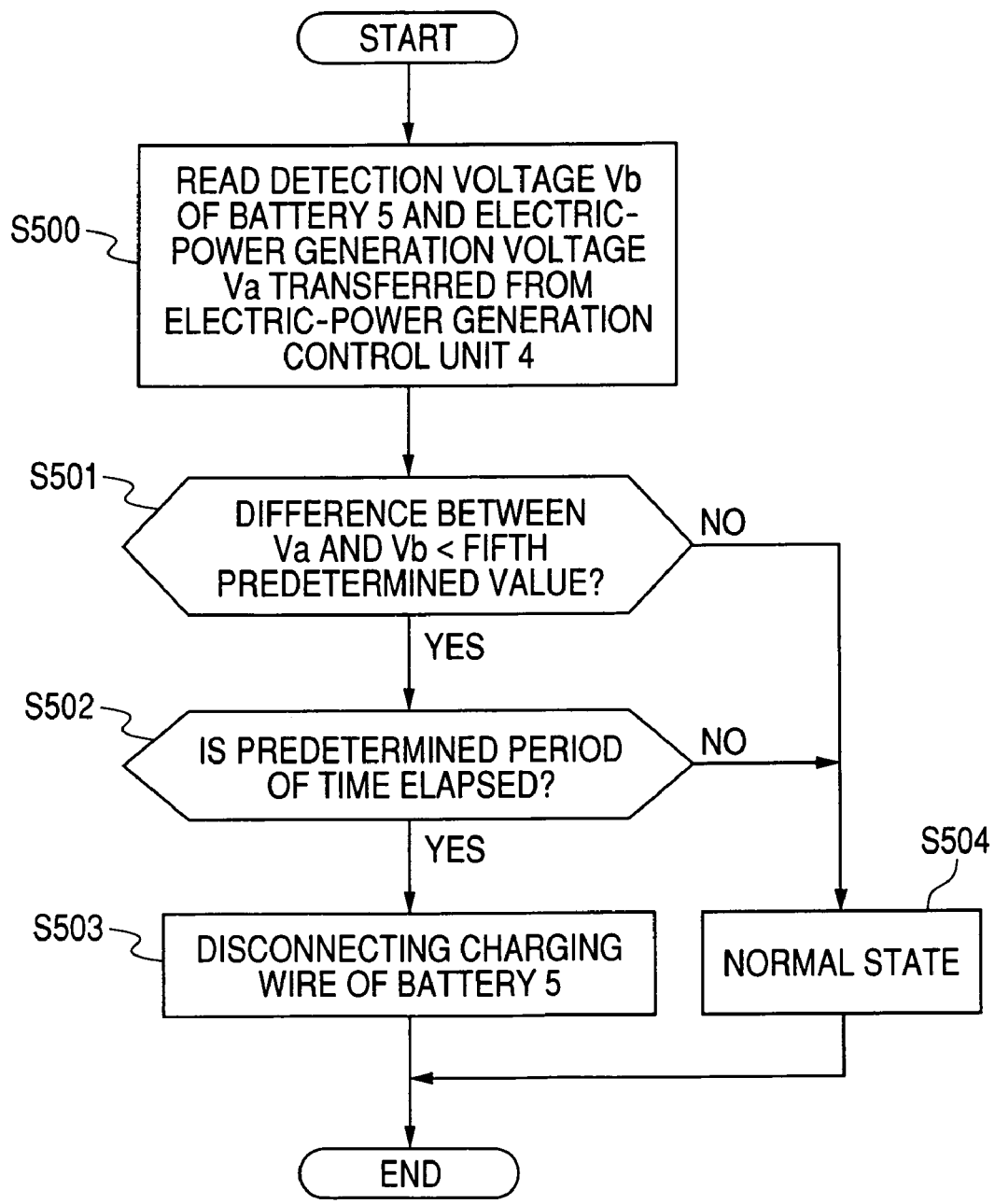
FIG. 7 is a flow chart showing the judging operation of judging occurrence of disconnecting a charging wire of the battery performed by the battery current detection device in the vehicle control system according to the embodiment of the present invention.

FIG. 7 is a flow chart of the judging operation of judging the occurrence of disconnecting of the charging wire of the battery 5 by the battery current detection device 6 in the vehicle control system according to the embodiment of the present invention.

The microcomputer 64 reads the detected battery voltage value Vb through the A/D converter 62 and an electric-power generation voltage value Va contained in the electric-power generation state signal transferred from the electric power generation control device 4 (step S500).

The microcomputer 64 judges whether or not a difference between the electric-power generation voltage value Va and the detected battery voltage value Vb is more than a fifth predetermined value (step S501).

When the judgment result in step S501 indicates "YES", namely, the difference is more than the fifth predetermined value, the operation flow goes to step S502. In step S502, the microcomputer 64 judges whether or not a predetermined period of time is elapsed under the state of satisfying "YES" in steps S501. When the judgment result in step S502 indicates "YES", namely, the predetermined period of time has been elapsed, the microcomputer 64 judges that a disconnecting of the charging wire occurs in the battery 5 (step S503).

On the other hand, when the judgment result in each of steps S501, and S502 indicates "NO", the microcomputer 64 judges that the battery 5 is in the normal condition, namely, the charging wire of the battery 5 correctly operates (step S504).

Figure 8:
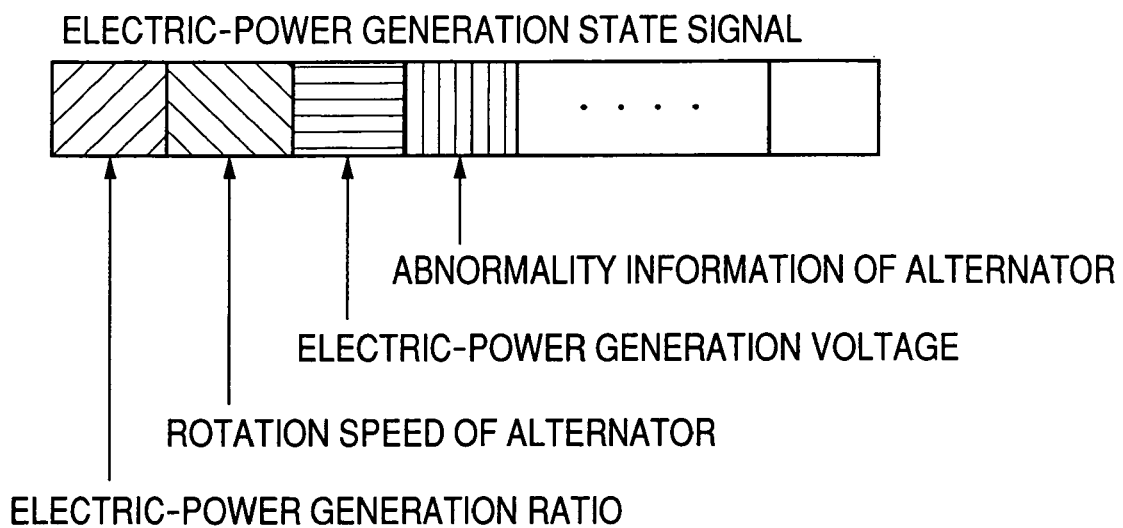
FIG. 8 shows a frame format of an electric-power generation state signal to be transferred from the built-in electric power generation control device to the battery current detection device through a communication line in the vehicle control system according to the embodiment of the present invention.

FIG. 8 shows a frame format for the electric-power generation state signal to be transferred from the electric power generation control device 4 to the battery current detection device 6 through the digital communication line in the vehicle control system according to the embodiment of the present invention.

The frame format of the electric-power generation state signal shown in FIG. 8 contains the electric-power generation ratio of the vehicle alternator 5, the rotation speed of the vehicle alternator 5, the electric-power generation voltage of the vehicle alternator 5, and the abnormal information of the vehicle alternator 5.

Figure 9:
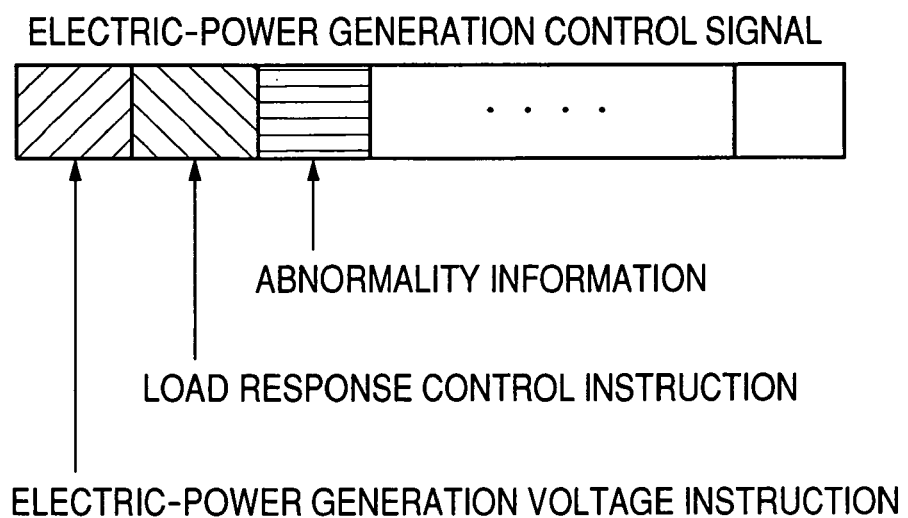
FIG. 9 shows a frame format for an electric-power generation control signal to be transferred from the battery current detection device to the built-in electric power generation control device through the communication line in the vehicle control system according to the embodiment of the present invention.

FIG. 9 shows a frame format for the electric power generation control signal to be transferred from the battery current detection device 6 to the electric power generation control device 4 through the communication line in the vehicle control system according to the embodiment of the present invention.

The frame format to be transferred shown in FIG. 9 contains the electric-power generation voltage instruction value, the load response control instruction value, and the abnormal information stored in the electric-power generation control signal storage unit 76 in the battery current detection device 6.

As described above in detail, the vehicle control system according to the embodiment of the present invention can inform the vehicle driver or passengers of the occurrence of abnormal state of each detection means through the display unit 7 (or the warning lamp) connected to the vehicle alternator 3 through the L terminal. Accordingly, because the vehicle control system according to the present invention does not require any special display unit to display the abnormal information, it is possible to avoid increasing the area for packaging the instrument panel and to also prevent increasing the total manufacturing cost thereof.

Still further, because the vehicle control system according to the present invention can perform the digital data communication to transfer the abnormal information between the battery current detection device 6 and the electric power generation control device 4 through the digital communication line, it is possible to reduce the influence of noise. Still further, because the vehicle control system according to the present invention can inform the occurrence of abnormal state to the vehicle driver and passengers without using any ECU and the like, it is possible to reduce the operation load of the ECU.

Moreover, because the vehicle control system according to the present invention informs the occurrence of the battery failure and the disconnecting of the charging wire of the battery 5 in addition to the occurrence of abnormal state of the detection means to the vehicle driver and passengers through the display unit 7, the vehicle driver and passengers know the abnormal state and failure from many different causes through the display unit 7. This increases the reliability of the charging system to charge the battery 5.

Still further, because the vehicle control system of the present invention informs the occurrence of abnormal state of each detection means, the battery failure, and the disconnecting of the charging wire by the different display patterns through the display unit 7, it is possible to notice the occurrence of the abnormal state of those detection means, the battery 5, and other devices by different display patterns which depend on their urgent priority.

Still further, the vehicle control system according to the present invention instructs the vehicle alternator 3 to perform its self-control electric-power generation operation instead of performing the electric-power generation control by the battery current detection device 6 when the abnormal state occurs. It is thereby possible to avoid a wrong control to the electric power generation of the vehicle alternator 3 caused depending on each abnormal state.

Features and Effects of the Present Invention

In the vehicle control system as another aspect of the present invention, it is further preferred that the abnormal state judgment means detects occurrence of abnormal state of the battery and occurrence of disconnecting a charging wire of the battery electrically connected to the vehicle alternator, in addition to detecting the occurrence of abnormal state of each of the battery current detecting means, the battery voltage detection means, and the battery temperature detection means.

The abnormal state judgment means adds, into the abnormal state information to be transferred to the vehicle alternator, the detection results regarding the occurrence of abnormal state of the battery and the occurrence of disconnecting the charging wire, in addition to the information of the occurrence of the abnormal state of each of the battery current detecting means, the battery voltage detection means, and the battery temperature detection means. The structure of the vehicle control system according to the present invention can judge the occurrence of abnormal state of a wide range, such as abnormal state of each detection means, the battery failure, and the disconnecting of the charging wire of the battery through the display unit. It is thereby possible to enhance the reliability of the battery charging system to change the battery.

In the vehicle control system as another aspect of the present invention, it is further preferred that the vehicle alternator instructs the display unit to display the abnormal state information transferred from the battery current detection device using different display patterns depending on the type of the abnormal state. For example, the occurrence of the battery failure and the disconnecting of the charging wire of the battery is high in degree of urgency because it often makes a dead battery and causes a difficulty to start the engine. On the other hand, the occurrence of abnormal state of each detection means is relatively low in degree of urgency because it only causes a difficulty to charge the battery. Thus, the vehicle control system according to the present invention can distinguish the display pattern for the occurrence of abnormal state of each of the battery current detection means, the battery voltage detection means, and the battery temperature detection means from the display pattern for the occurrence of the battery failure and disconnecting of the charging wire of the battery. This structure of the vehicle control system according to the present invention can eliminate the vehicle driver and passengers from uneasy feeling while the vehicle drives.

In the vehicle control system as another aspect of the present invention, it is further preferred that the abnormal state judgment means judges the occurrence of abnormal state in each detection means when a predetermined condition is continued for a predetermined period of time, which satisfies that the detection result of each of the battery current detecting means, the battery voltage detection means, and the battery temperature detection means is more than a first predetermined value or less than a second predetermined value, where the first predetermined value is larger than the second predetermined value. Both the first and second predetermined values are set in advance for each of the battery current detecting means, the battery voltage detection means, and the battery temperature detection means Further, in the vehicle control system as another aspect of the present invention, it is further preferred that the abnormal state judgment means judges the occurrence of making a short circuit in the battery when a predetermined condition is continued for a predetermined period of time, which satisfies that the voltage value detected by the battery voltage detection means is less than a third predetermined value and the current value detected by the battery current detection means is more than a fourth predetermined value.

Still further, in the vehicle control system as another aspect of the present invention, it is further preferred that the abnormal state judgment means judges the occurrence of making a battery open circuit failure in the battery when the current value detected by the battery current detection means is zero ampere and a normal state of the battery is continued for a predetermined period of time. It is also preferred that the abnormal state judgment means judges the occurrence of disconnecting the charging wire of the battery when a predetermined condition is continued for a predetermined period of time, which satisfies that a difference between the voltage value detected by the battery voltage detection means and the electric-power generation voltage value of the vehicle alternator is more than a fifth predetermined value.

According to the present invention, it is thereby possible to easily judge the occurrence of abnormal state of each detection means, the battery failure, and the disconnecting of the charging wire of the battery with certainly.

Still further, in the vehicle control system as another aspect of the present invention, it is further preferred that the vehicle alternator performs a self-control electric-power generation without the control by the control means when the abnormal state judgment means judges the occurrence of abnormal state. It is thereby possible to avoid any failure control for the electric-power generation of the vehicle alternator, and to continue the optimum electric-power generation control for the vehicle alternator.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicle control system comprising:
    a battery;
    a vehicle alternator capable of charging the battery; and
    a battery current detection device comprising:
        a battery current detecting means that detects a charging current and a discharging current of the battery;
        a battery voltage detection means that detects a terminal voltage of the battery;
        a battery temperature detection means that detects a temperature of the battery;
    a control means that controls the operation of the vehicle alternator based on detection results transferred from the battery current detecting means, the battery voltage detection means, and the battery temperature detection means; and
    a communication means that performs a digital data transmission between the vehicle alternator and the battery current detection device; and
    an abnormal state judgment means that judges whether or not an abnormal state of each of the battery current detecting means, the battery voltage detection means, and the battery temperature detection means has occurred, and transfers abnormal state information for informing the occurrence of abnormal state of each of the battery current detecting means, the battery voltage detection means, and the battery temperature detection means to the vehicle alternator through the communication means.

2. The vehicle control system according to claim 1, wherein the vehicle alternator comprises a display unit and an abnormal information means that informs the occurrence of abnormal state of each detection means, and the vehicle alternator informs the occurrence of abnormal state of each detection means to a vehicle driver through the display unit when receiving the abnormal state information transferred from the battery current detection device.

3. The vehicle control system according to claim 1, wherein the abnormal state judgment means detects a battery failure and a disconnecting of a charging wire of the battery electrically connected to the vehicle alternator, in addition to detecting the occurrence of abnormal state of each of the battery current detecting means, the battery voltage detection means, and the battery temperature detection means, and
    the abnormal state judgment means adds, into the abnormal state information to be transferred to the vehicle alternator, the detection results regarding the battery failure and disconnecting of the charging wire of the battery, in addition to the information of the occurrence of the abnormal state of each of the battery current detecting means, the battery voltage detection means, and the battery temperature detection means.

4. The vehicle control system according to claim 3, wherein the vehicle alternator instructs the display unit to display the abnormal state information transferred from the battery current detection device using different display patterns which depend on the type of the abnormal state.

5. The vehicle control system according to claim 1, wherein the abnormal state judgment means judges the occurrence of abnormal state in each detection means when a predetermined condition is continued for a predetermined period of time, which satisfies that the detection result of each of the battery current detecting means, the battery voltage detection means, and the battery temperature detection means is more than a first predetermined value or less than a second predetermined value, where the first predetermined value is more than the second predetermined value, and the first and second predetermined values are set in advance for each of the battery current detecting means, the battery voltage detection means, and the battery temperature detection means.

6. The vehicle control system according to claim 3, wherein the abnormal state judgment means judges the occurrence of making a short circuit in the battery when a predetermined condition is continued for a predetermined period of time, which satisfies that the voltage value detected by the battery voltage detection means is less than a third predetermined value and the current value detected by the battery current detection means is more than a fourth predetermined value.

7. The vehicle control system according to claim 3, wherein the abnormal state judgment means judges the occurrence of making a battery open circuit failure in the battery when the current value detected by the battery current detection means is zero ampere and a normal state of the battery is continued for a predetermined period of time.

8. The vehicle control system according to claim 3, wherein the abnormal state judgment means judges the occurrence of disconnecting the charging wire of the battery when a predetermined condition is continued for a predetermined period of time, which satisfies that a difference between the voltage value detected by the battery voltage detection means and the electric-power generation voltage value of the vehicle alternator is more than a fifth predetermined value.

9. The vehicle control system according to claim 1, wherein the vehicle alternator performs a self-control electric-power generation without the control by the control means when the abnormal state judgment means judges the occurrence of abnormal state.

10. The vehicle control system according to claim 1, wherein the control means is comprised of a microcomputer, the battery current detecting means is comprised of a shunt resistance, an amplifier, and an analogue to digital converter, the battery voltage detection means is comprised of a pair of resistances, an amplifier, and an analogue to digital converter, and the battery temperature detection means is comprised of a temperature sensor and an analogue to digital converter, and the output of each analogue to digital converter is connected to the microcomputer.

* * * * *